Aug. 24, 1948.   R. GLUNTZ   2,447,501
GRID ELECTRODES FOR ELECTRON
DISCHARGE DEVICES
Filed April 13, 1943

INVENTOR.
R. GLUNTZ
BY
*Edward D. Finney*
ATTORNEY

Patented Aug. 24, 1948

2,447,501

UNITED STATES PATENT OFFICE 2,447,501

GRID ELECTRODE FOR ELECTRON DISCHARGE DEVICES

Roger Gluntz, Lyon, France, assignor to International Standard Electric Corporation, New York, N. Y., a corporation of Delaware Application April 13, 1943, Serial No. 482,902
In France February 15, 1941

Section 1, Public Law 690, August 8, 1946
Patent expires February 15, 1961

7 Claims. (Cl. 250—27.5)

The present invention relates to electrode structures for vacuum discharge tubes and more particularly but not exclusively to the grid type of electrodes usable in such tubes.

It is usual in certain types of electronic discharge tubes to use electrodes, particularly grids, of the so-called squirrel cage type, consisting of a plurality of spaced bars customarily in parallel relation and supported in a cylindrical plane, these rods being secured together at both ends. In this type of electrode, where the rods or bars are to be connected or closed at one end, a conventional way of effecting the joining of the rods at said end is to employ rods or bars of U-form, the branches of which are positioned in the cylindrical plane while the bases or cross-connections are ordinarily in diametrical relation with respect to the cylindrical plane formation and over-lap one another.

In this type of construction, and as is readily understood, the over-lapping of the bases or transverse portions of the U-bars produce, at the bottom of the electrode, a substantial thickness and concentration of metal at the point of cross-over or axis of the cylinder, the electrical action of which is objectionable, owing to the fact that the extra length at the bottom of the electrode has a capacity that is relatively large with respect to the side and bottom of the electrode surrounding it, for example, the side and bottom of the anode.

An important object of the present invention is to provide an improved squirrel cage type of electrode which will eliminate to a substantial degree the undesirable concentration of the conductive metal and thus reduce parasitic capacities between the bottom of the electrode and the side and bottom of an associated electrode. The advantage of the present improvement resides in a material reduction in the depth of the bottom wall or cross-over portion of the electrode so formed.

For the described purposes, the improved squirrel cage type of electrode incorporating the features of the present invention is constituted by an assembly of U-shaped bars or rods so arranged that the transverse or connecting bar portions thereof instead of crossing one another at the axis of symmetry of the cylindrical plane are arranged or grouped whereby at least a majority of said transverse portions are in non-diametrically positioned relation and preferably constitute groups of spaced and parallel members.

The foregoing and other features and advantages of the present invention will be more fully understood by reference to the accompanying drawings wherein like reference characters are applied to the corresponding parts in the several views.

The customary arrangement of a squirrel cage electrode, such as those used as grids in certain types of vacuum discharge tubes, comprises a suitable number of U-shaped conductor rods or wires whose portions corresponding to the branches of the U-formation are positioned in spaced and parallel relation and in a cylindrical plane and are secured to or assembled with a ring or crown at the upper end thereof. At the lower portions the transverse bar or wire connections corresponding to the bases of U-form are arranged diametrically so as to constitute a bottom or connecting wall for the electrode, so formed as to be of generally cylindrical basket formation. Owing to the superpositioning of these diametrical connecting portions in the center and at the central axis of the cylindrical formation there occurs a substantial depth or thickness of overlying metal. This enlarged projection calls for a longer length of the tube along the axis of symmetry of the general structure and these considerations may become important features in the successful operation of the tube particularly when designed to operate at very high frequencies.

Figure 1:
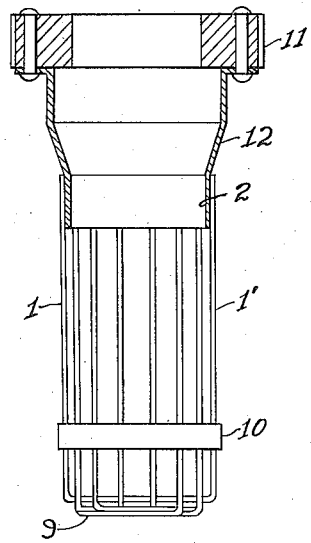
Figs. 1 and 2 are schematical views in side elevation and in bottom plan of a squirrel cage type of electrode made in accordance with the present invention.
Figure 2:
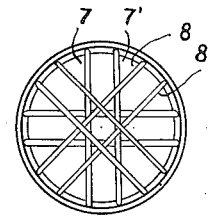

To eliminate the aforesaid disadvantages of the described conventional arrangement, or at least to substantially reduce them, the invention according to certain of its features provides for the arrangement of the U-shaped bars in a way to associate the transverse or connecting portions thereof in groups of spaced parallel members thereof which correspondingly reduces the bottom depth or thickness. As an example thereof there is shown in Figs. 1 and 2 an arrangement in which the U-shaped bars have the same length of transverse connecting portions and are assembled in groups consisting of pairs of bars as indicated at 7—7' and 8—8' and where, in the arrangement disclosed, all of the bars are positioned in spaced relation to the central axis. In this arrangement, wherein the cross bar connections may be said to be regularly distributed through rotation throughout the bottom circumference of the electrode, an electrode bottom wall is obtained which is half the thickness or depth as that of the described prior art construction. In this improved arrangement, as will be noted, a production and assembly advantage in manufacture, incident to the employment of uniform or identical bars is obtained.

As shown in Fig. 1, 2 indicates the ring for fastening the upper ends of the U-shaped rods or wires, 10 a holding ring adjacent the lower end of the cage structure and 11 indicates the customary supporting and feeding crown to which the squirrel cage type electrode is connected by a rigid screen member 12.

Figure 3:
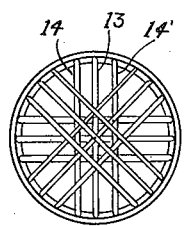
Figs. 3 and 4 are bottom plan views illustrating modified conductor arrangements incorporating the features of the invention.
Figure 4:
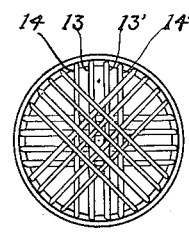

While there is shown and described in connection with Figs. 1 and 2 a preferred embodiment of the features of the invention it will be understood that various modifications thereof may be made without departing from the scope of the invention as defined in the appended claims. As illustrative thereof and shown in Figs. 3 and 4 when it is desired to reduce still further the thickness of the bottom of the electrode in order to further reduce parasitic capacities in relation to a cooperating electrode, the use of U-shaped bars having bases of different length may be employed and assembled in parallel groups with the branches of the U-form conductors positioned in the cylindrical plane desired for the electrode. In the arrangement as shown in Fig. 3 the conductor wires of U-form are arranged in groups of three having two dimensions of connecting portions 13 and 14, the central of which is slightly longer than the oppositely spaced similar length connections 14 and 14'. This arrangement of Fig. 3 accordingly reduces the thickness of the bottom of the electrode to one-third the thickness of that of the described prior art construction. In Fig. 4 there is shown a further modification wherein the connecting portions are indicated in parallel spaced bar groups of four employing the two different lengths of connecting portions indicated at 13, 13' and 14, 14'.

As will be obvious the features of the invention are not limited to the embodiment wherein the conductor wires are integrally formed in the U-formation as shown for it will be understood that the U-shaped members may be built up from straight vertical leg portions and horizontal cross-connecting members connected thereto and arranged as above described.

What is claimed is:

1. A squirrel cage type grid electrode for an electron discharge device comprising sets of at least two adjacent metallic elements of substantially U form, the elements of each set being substantially parallel to one another with their longitudinal arms supported in a cylindrical surface and their transverse portions positioned in a common plane substantially perpendicular to the cylindrical surface, the transverse portions of different sets being arranged in superimposed parallel planes.

2. A squirrel cage type grid electrode for an electron discharge device comprising parallel longitudinal arms disposed substantially in a cylindrical surface and having transverse portions connecting said arms and arranged in sets of at least two elements, the transverse portions of each set being arranged adjacent in the same plane, and the transverse portions of different sets being arranged in superimposed parallel planes substantially perpendicular to said cylindrical surface.

3. A squirrel cage type grid electrode for an electron discharge device comprising metallic elements of substantially U-form supported with their longitudinal arms in a cylindrical surface and arranged in sets of at least two adjacent elements each set containing the same number of adjacent elements having transverse portions arranged in spaced, parallel fashion in the same plane, the different sets of transverse portions being arranged in superimposed parallel planes substantially perpendicular to said cylindrical surface, at least one set being arranged crossing another of said sets.

4. An electrode according to claim 2 in which each pair of longitudinal arms and the corresponding transverse portions are integrally formed in U-shape.

5. A squirrel cage type grid electrode according to claim 3 in which the transverse portions of each set are symmetrically arranged with respect to the axis of said cylindrical surface.

6. A squirrel cage type grid electrode for an electron discharge device comprising sets of two adjacent metallic elements of substantially U form having their longitudinal arms supported in a cylindrical surface and at the end connecting portions positioned in the same plane, the connecting portions of different sets of elements being arranged in superimposed parallel planes across the circular end of the cylinder defined by said cylindrical surface, and said elements being equidistant from a diameter of said circular end.

7. A squirrel cage type grid electrode for an electron discharge device comprising sets of three adjacent metallic elements of substantially U form having their longitudinal arms supported in a cylindrical surface and the end connecting portions of said adjacent elements extending parallel to one another and in the same plane, the connecting portions of different sets of elements being arranged in superimposed parallel planes, across the circular end of the cylinder defined by said cylindrical surface, the middle one of said three elements lying on a diameter of said circular end and the other two elements being equidistant from a diameter of said circular end.

ROGER GLUNTZ.

REFERENCES CITED

The following references are of record in the file of this patent:

UNITED STATES PATENTS

| Number | Name | Date |
|---|---|---|
| 1,565,708 | Bullimore | Dec. 15, 1925 |
| 1,628,982 | Hulsizer | May 17, 1927 |
| 2,030,362 | Eitel et al. | Feb. 11, 1936 |
| 2,036,069 | Morrison | Mar. 31, 1936 |
| 2,054,119 | Daene | Sept. 15, 1936 |
| 2,189,358 | Farnsworth | Feb. 6, 1940 |
| 2,317,222 | Ronci | Apr. 20, 1943 |
| 2,359,514 | Eitel et al. | Oct. 3, 1944 |

FOREIGN PATENTS

| Number | Country | Date |
|---|---|---|
| 550,972 | Great Britain | Feb. 2, 1942 |